(12) United States Patent
Aoki et al.

(10) Patent No.: US 7,107,271 B2
(45) Date of Patent: Sep. 12, 2006

(54) AGENT INTERFACE DEVICE

(75) Inventors: Tsuguhiro Aoki, Yamatokoriyama (JP); Kenichi Kuromusha, Yamatokoriyama (JP); Ikuo Keshi, Nara (JP); Junko Nakagawa, Higashiosaka (JP); Kenichi Inui, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 781 days.

(21) Appl. No.: 09/908,489

(22) Filed: Jul. 19, 2001

(65) Prior Publication Data

US 2002/0059180 A1 May 16, 2002

(30) Foreign Application Priority Data

Aug. 29, 2000 (JP) ............................. 2000-258419

(51) Int. Cl.
*G06F 17/30* (2006.01)
(52) U.S. Cl. .................... 707/10; 707/10; 707/101; 707/102; 707/103; 707/104.1; 348/14.03; 709/203; 709/229
(58) Field of Classification Search ............ 707/104.1, 707/2, 6, 9–10, 3, 101, 102, 103 X; 434/118; 709/202, 229, 203; 725/39–56, 61; 348/14.03
See application file for complete search history.

(56) References Cited

U.S. PATENT DOCUMENTS

| | | | | |
|---|---|---|---|---|
| 5,388,993 | A * | 2/1995 | McKiel et al. ............... | 434/118 |
| 5,524,195 | A * | 6/1996 | Clanton et al. ............... | 725/61 |
| 5,822,123 | A * | 10/1998 | Davis et al. .................. | 725/43 |
| 6,088,731 | A * | 7/2000 | Kiraly et al. ............... | 709/229 |
| 6,216,133 | B1 * | 4/2001 | Masthoff .................. | 707/104.1 |
| 6,249,720 | B1 * | 6/2001 | Kubota et al. .................. | 701/1 |
| 6,427,063 | B1 * | 7/2002 | Cook et al. .................. | 434/350 |
| 6,446,076 | B1 * | 9/2002 | Burkey et al. .............. | 707/102 |
| 6,614,987 | B1 * | 9/2003 | Ismail et al. .................. | 386/83 |
| 6,637,029 | B1 * | 10/2003 | Maissel et al. ................ | 725/46 |
| 6,665,640 | B1 * | 12/2003 | Bennett et al. ............. | 704/257 |
| 6,757,906 | B1 * | 6/2004 | Look et al. .................... | 725/45 |
| 2001/0042057 | A1 * | 11/2001 | Ikebe et al. .................... | 706/11 |
| 2002/0146676 | A1 * | 10/2002 | Reynolds ..................... | 434/362 |
| 2003/0046689 | A1 * | 3/2003 | Gaos ........................... | 725/34 |
| 2004/0030741 | A1 * | 2/2004 | Wolton et al. .............. | 709/202 |
| 2005/0267935 | A1 * | 12/2005 | Gandhi et al. .............. | 709/203 |

FOREIGN PATENT DOCUMENTS

| | | |
|---|---|---|
| JP | 8-305531 | 11/1996 |
| JP | 2001-325052 A | 11/2001 |
| WO | WO 9901984 A1 * | 1/1999 |

OTHER PUBLICATIONS

U.S. Appl. No. 09/855,547, filed May 18, 2001, entitled "Agent Display Apparatus Displaying Personified Agent for Selectively Executing Process".
Patent Abstracts of Japan, 2001-325052 published Nov. 22, 2001.

* cited by examiner

Primary Examiner—Thuy N. Pardo
(74) Attorney, Agent, or Firm—Nixon & Vanderhye, PC

(57) ABSTRACT

An agent interface device provides information suited for user preferences on the basis of a usage history. In an example implementation, the agent interface device controls the display and action of the agent. A user preference database stores user preferences. An information providing engine provides information to the user according to information in the preference database, and a timer sets a time for the information providing engine to provide information to the user.

16 Claims, 16 Drawing Sheets

AGENT INTERFACE DEVICE

BACKGROUND OF THE INVENTION

The present invention relates to an agent interface device using an artificial agent.

Japanese Laid-Open Patent Publication No. 8-305531 discloses a prior art technique by which a personified agent to be displayed on a personal computer of home electronics is interposed between a control application program of the home electronic apparatus and a user so that a user may control the electronic apparatus by or via the agent.

However, the prior art involves the following problems.

The technique disclosed in Japanese Laid-Open Patent Publication No. 8-305531 provides merely the same functions as those of a remote control of a TV set when viewing a TV program on a display of a personal computer, so a user may lose a chance of viewing an interesting TV program if he or she does not positively drive in time a television application program.

The user must positively acquire TV program guides to know a schedule of broadcasting interesting TV programs.

With the prior art, the user may not be aware if the application device was left as connected to the Internet for a long time.

With the prior art, the user cannot know whether resources become short when using a plurality of applications.

SUMMARY OF THE INVENTION

The present invention was made to solve the above problems involved in the prior art device.

Accordingly, the present invention is intended to provide an agent capable of teaching a user a TV program recommendable or suitable to the user preference a little while before the beginning of the program so as not to lose a chance of viewing it.

The present invention is also intended to provide an agent capable of providing a guide and information of programs suited to the user preference.

The present invention is further intended to provide an agent capable of advising the user to cut off the device connected to the Internet for a long time.

The present invention is still further intended to provide an agent capable of informing the user of shortage of the system resource to prevent the system from unstably operating.

An object of the present invention is to provide an agent interface device for displaying an artificial agent for providing information by the agent's action and speech, comprising: an agent interface having an agent display control means for controlling the display and action of the agent, a voice output means for generating a speech of the agent, and an input means for input by a user, an action script execution engine for driving the agent interface into actual action according to an action script describing means to control the agent interface, a retrieval engine for retrieving an adapted action script from an action script database and transferring the action script to the action script executing engine, an application program interface for controlling an application program, an electronic program guide information acquiring means for acquiring an electronic broadcast program guide, a preference database for analyzing user preferences from information provided by the electronic program guide information acquiring means and the application program interface and storing analysis results therein, an information providing engine for providing information to a user according to information stored in the preference database, and a timer for setting a time for providing information to the user by the information providing engine.

Another object of the present invention is to provide an agent interface device, characterized in that it is further provided with means capable of deciding a user preferred television program from a user usage history of a television application controllable by the application program interface according to information from the electronic program guide information acquiring means and information from the preference database, of displaying the agent at a specified time (n minutes) before a start time of the user preferred TV program and, of causing the agent to have a conversation with the user about the user preferred TV program by a speech output through the voice outputting means.

Another object of the present invention is to provide agent interface device, characterized in that it is further provided with means capable of deciding a user preferred genre from a user usage history of a television application controllable by the application program interface according to information from the electronic program guide information acquiring means and information from the preference database, of displaying the agent at a specified time (n minutes) before a start time of the user preferred genre TV program, and of causing the agent to have a conversation with the user about the user preferred genre by a speech through the voice outputting means.

Another object of the present invention is to provide agent interface device, characterized in that it is further provided with means capable of displaying the agent immediately after the end of a TV program of a television application controllable by the application program interface and of causing the agent to have a conversation with the user about the just viewed program.

Another object of the present invention is to provide agent interface device, characterized in that the agent is displayed immediately after ending a television application controllable by the application program interface and an internet retrieval means for retrieving information on the Internet is provided to retrieve information from a web site relevant to the just viewed program.

Another object of the present invention is to provide agent interface device, characterized in that it is further provided with means capable of displaying the agent immediately after ending a video recording device controllable by the application program interface and of making conversation with the user about a just viewed video program.

Another object of the present invention is to provide agent interface device, characterized in that the agent is displayed immediately after ending a video recording device controllable by the application program interface and an internet retrieval means for retrieving information on the Internet is further provided to retrieve information from a web site relevant to a just viewed video program.

Another object of the present invention is to provide agent interface device, characterized in that it is provided with means capable of displaying the agent immediately after ending an internet browser application program controllable by the application program interface and of causing the agent to make conversation with the user about a just browsed web site.

Another object of the present invention is to provide agent interface device, characterized in that the agent is displayed immediately after ending an internet browser application program controllable by the application program interface and an internet retrieval means for retrieving information from a web site on an internet is provided to browse a web site relevant to a just browsed site.

Another object of the present invention is to provide agent interface device, characterized in that it is capable of changing a theme of a conversation in accordance with a keyword of a program displayed by a television application controllable by the application program interface.

Another object of the present invention is to provide agent interface device, characterized in that it is capable of changing a theme of a conversation according to time interval information obtainable from a usage history of a television application controllable by the application program interface.

Another object of the present invention is to provide agent interface device, characterized in that a table of frequently watched genre programs is prepared on the basis of a usage history of a television application controllable by the application program interface and displayed when driving a television application controllable by the application program interface.

Another object of the present invention is to provide agent interface device, characterized in that the agent is capable of informing the user of a communication line still connected to the Internet when n minutes elapsed after driving an internet browser application program controllable by the application program interface.

Another object of the present invention is to provide agent interface device, characterized in that the agent is capable of informing the user of shortage of a system resource when a resource of the system runs short (it becomes n %).

PREFERRED EMBODIMENT OF THE INVENTION

A preferred embodiment of the present invention will be described bellow with reference to the accompanying drawings.

[First Embodiment]

Figure 1:
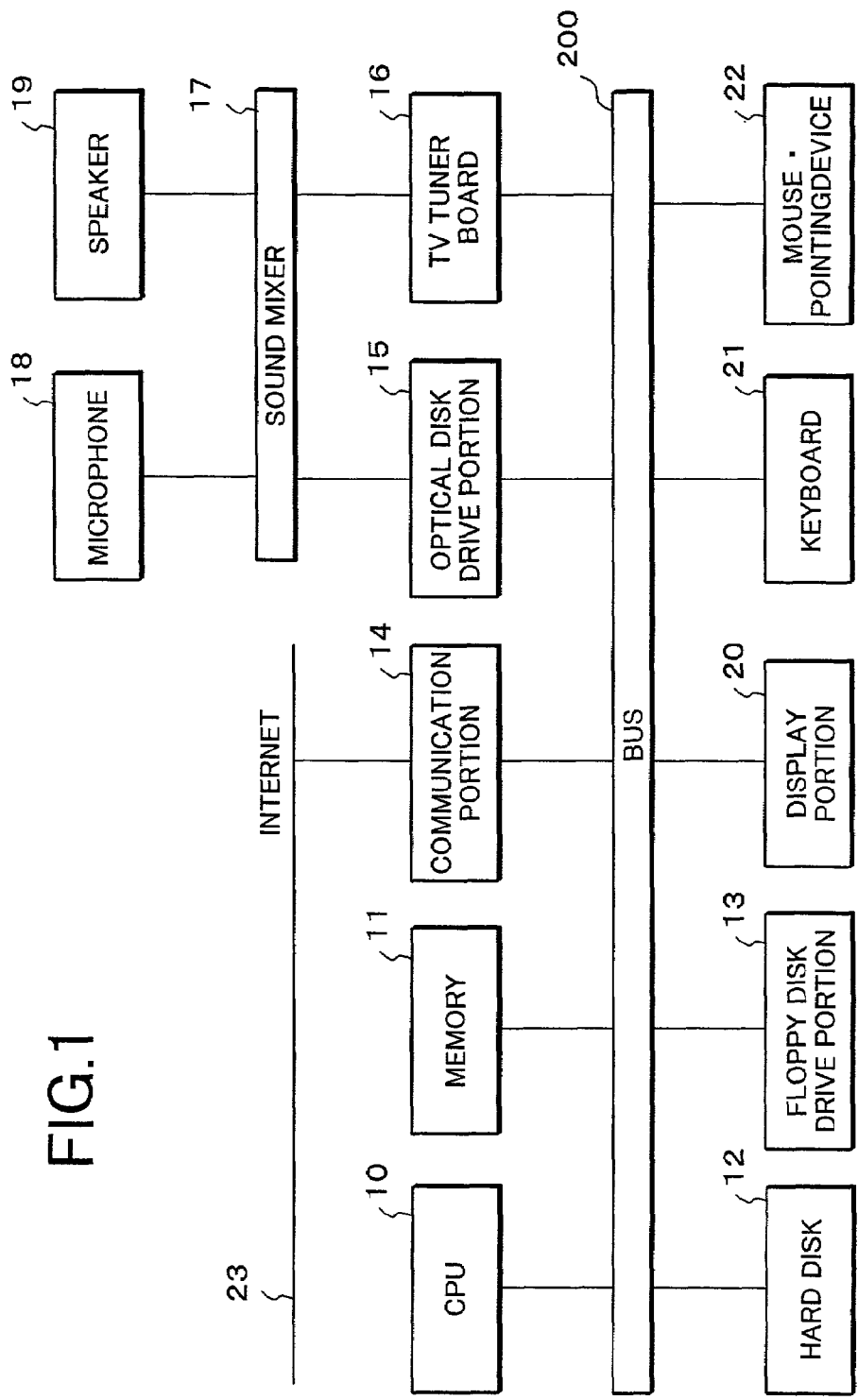
FIG. 1 is a construction view of an agent interface device according to the present invention.

FIG. 1 is a construction view of an agent interface device according to the present invention.

A CPU 10, a memory 11, a hard disk 12, a FD (Floppy Disk) drive portion 13, a communication portion 14, an optical disk drive 15, a TV tuner board 16, a display portion 20, a keyboard and mouse (pointing device) 22 are connected to a bus 200. A microphone 18 and a speaker 19 are connected through a sound mixer 17 to the optical disk drive 15 and the TV tuner board 16 in order for the user to have a conversation with an agent of a current application. The communication device 14 is connected to the Internet 23 to communicate with information sources on the Internet.

Figure 2:
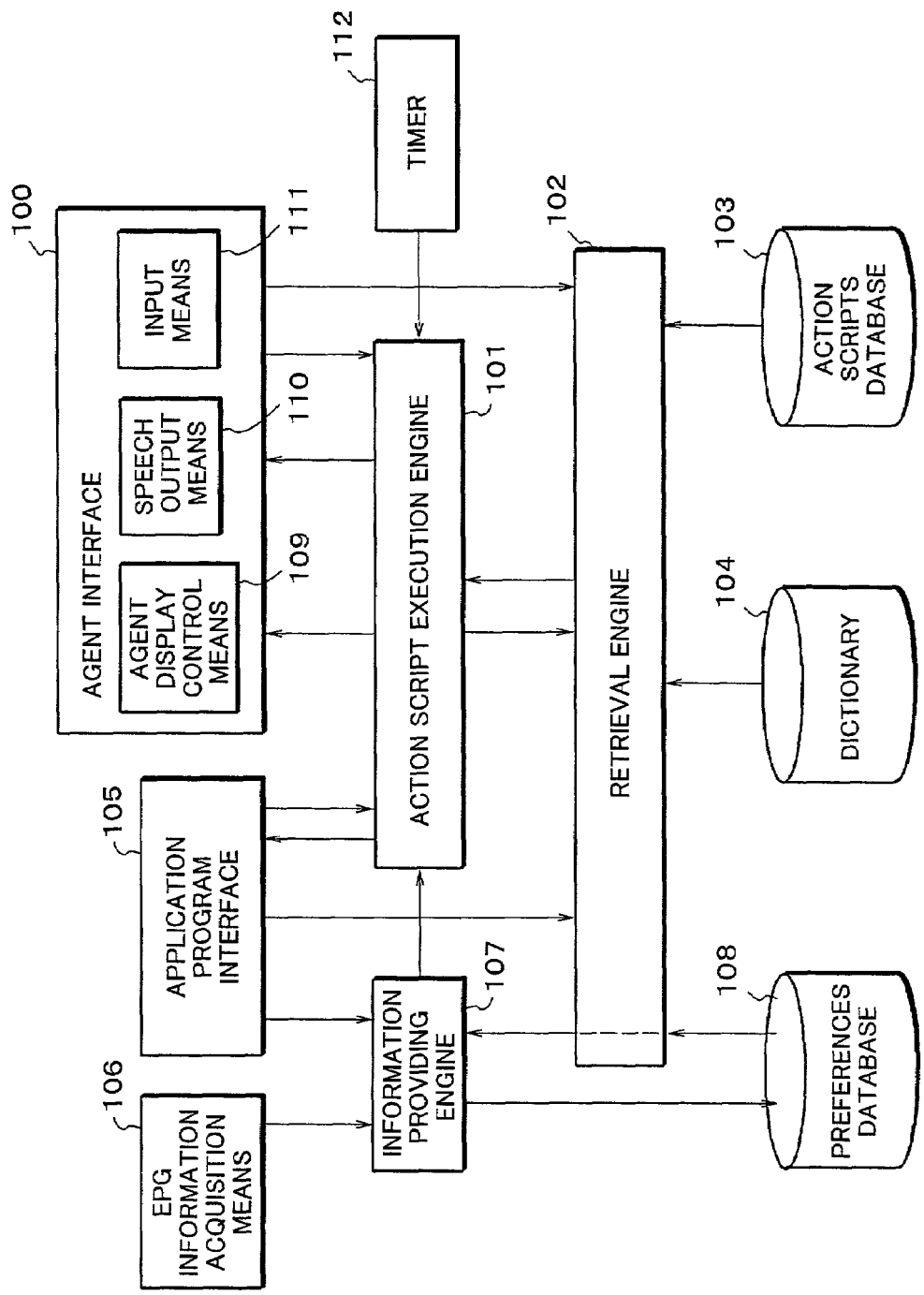
FIG. 2 is a module construction of an agent interface device according to the present invention.

FIG. 2 shows an example of a function module construction of an agent interface device according to the present invention. The agent interface device comprises an agent interface 100, an action script execution engine 101, a retrieval engine 102, an action scripts database 103, a dictionary 104, an application program interface 105, an electronic program guide (EPG) information acquisition means 106, an information providing engine 107, a user preference database DB108 and a timer 112. An agent display control means 109 is a module used for presenting an artificial agent (a personified agent or an impersonated agent) on a display portion 20 and controlling its actions. A speech output means (voice output means) 110 is a module for providing the agent with voice and outputs a speech of the agent through the speaker 19. The speech may be a synthesized voice speech or recorded human voice speech. It is not restricted to any of them. The input means 111 is a module for inputting a user's request to the agent by using a microphone 18, keyboard 21 or mouse (pointing device)

22. The input module 111 includes a voice recognition function for recognizing a speech inputted through the microphone 18. The agent interface 100 is composed of the agent display control means 109, the speech output means 110 and the input means 111. It serves as an interface between the user and the application program interface 105. This application program interface 105 is an interface that controls an application program and a control application program for a home electronic apparatus. The application program interface 105 controls a variety of applications on a personal computer and control applications for home electronic apparatuses such as televisions, video recorders and optical disk record players. The action script database 103 contains action scripts each of which describes a procedure of realizing a particular function by co-operation of the agent interface 100 and the application program interface 105. An example of an action script is as follows: The agent informs the user that a recommendable TV program suited to the user preference will start n minutes later.

The action script execution engine 101 analyzes an actual action script and controls the agent interface 100 and the application program interface 105 so that they may cooperatively execute the designated function. The retrieval engine 102 is a module that retrieves an adaptive script from the action script database DB103 according to a retrieval request from the input means 111 and transfers the action script to the action script execution engine 101. Since the retrieval request inputted vocally through the input means 111 includes a natural language, the retrieval engine 102 refers to the dictionary 104 if necessary, retrieves an action script most suited to the request, for example, an action script for "driving a television application program and selecting channel 2" from the action script database 103 and transfers it to the action script execution engine 101. The EPG information acquisition means 106 is used for acquiring an electronic television program guide (EPG). It may obtain the EPG, for example, from a web page for providing TV program information by accessing it through the communication device 14 connected to the Internet 23 or may acquire the EPG from a data broadcast by using the TV tuner board 16. The information providing engine 107 is used for storing data in the preference database DB108 and generating recommendation to the user based on information accumulated in the preference database DB108.

In case of TV programs, the information providing engine 107 obtains a TV state from the television application program interface which is one of the application program interface 105, refers to a program guide obtained from the EPG acquiring means 106 and records data of the program viewed by the user into the user preference database DB108. Based on the user usage history in the user preference database DB108, the information providing engine 107 refers to a table of programs obtained from the EPG acquiring means 106 to be broadcast, acquires data of programs that the user may want to watch and transfers the data to the action script execution engine 101. In this case, the information-providing engine may use the retrieval engine 102 if necessary.

[Second Embodiment]

Figure 3:
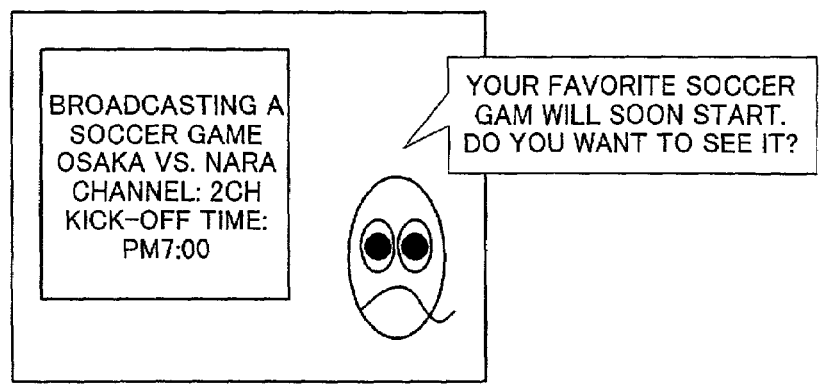
FIG. 3 is an exemplary display image of an agent of an agent interface device according to an embodiment of the present invention.
Figure 4:
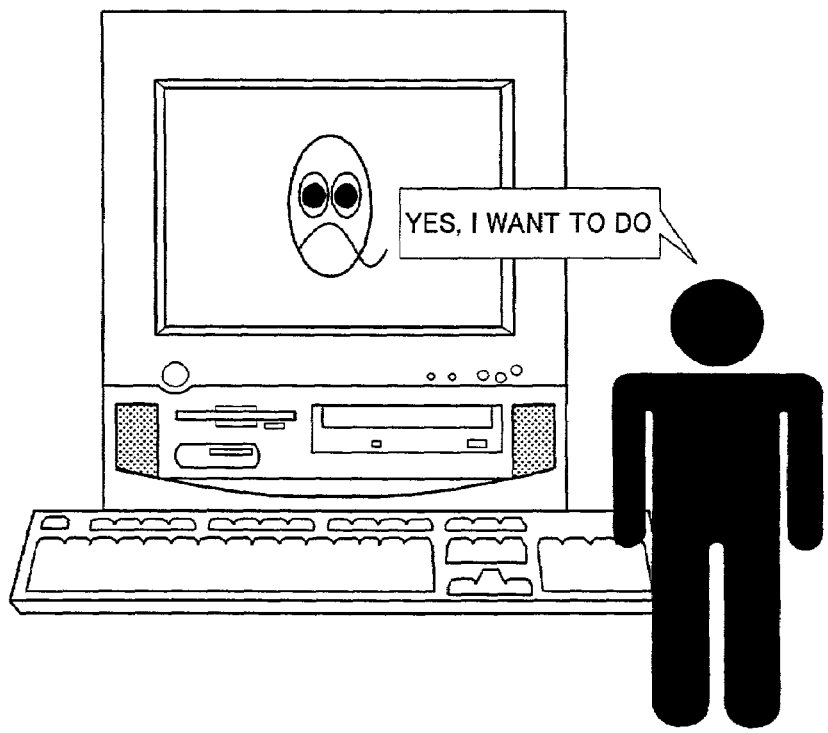
FIG. 4 illustrates an exemplary scene of usage of an agent interface device according to an embodiment of the present invention.
Figure 5:
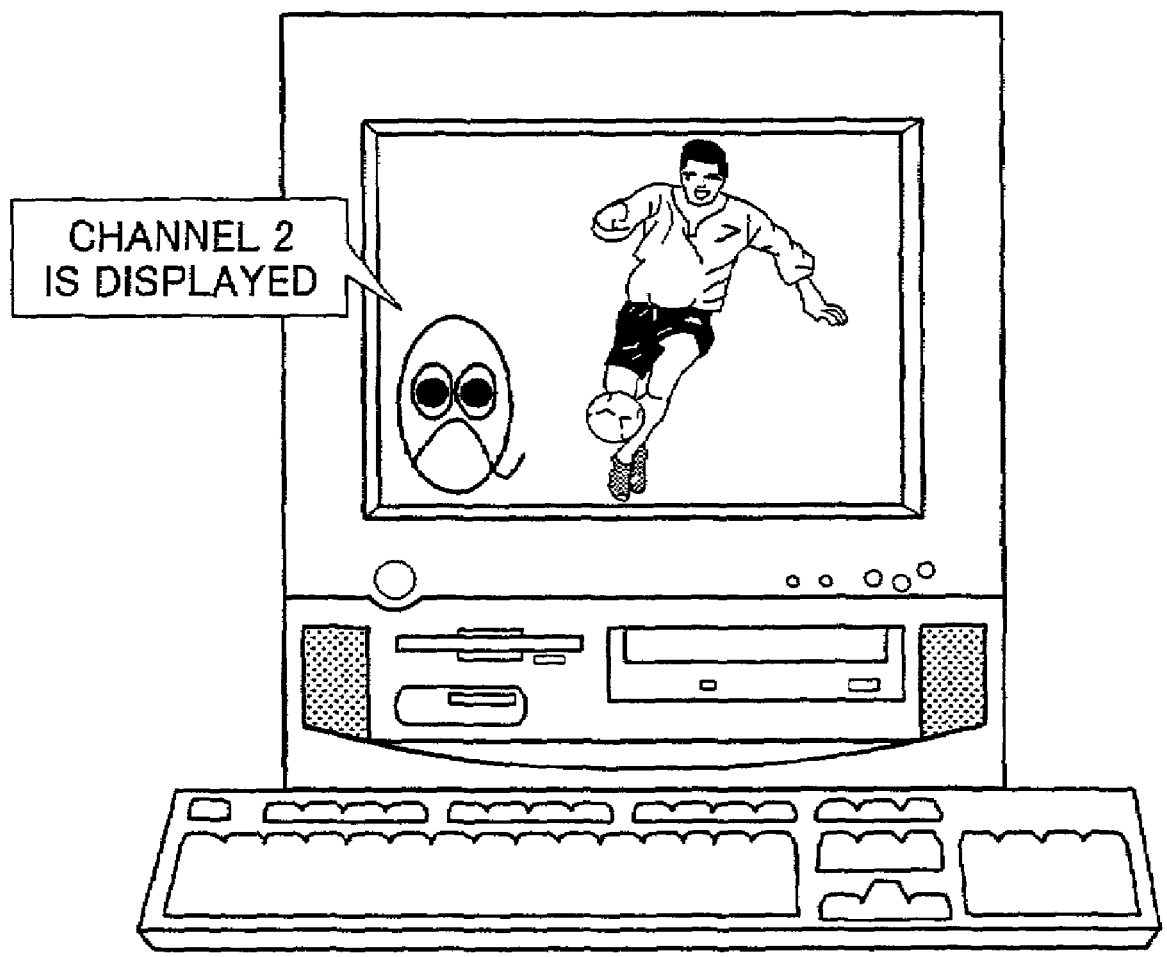
FIG. 5 illustrates an exemplary scene of an agent interface device according to an embodiment of the present invention.

FIG. 3 shows the first example of a screen image of an agent, according to the second embodiment of the present invention. Based on information on programs watched by the user and registered in the user preference database DB108, the agent interface device refers to a TV program guide acquired by the EPG information acquisition means 106, finds therein a program to be preferably viewed by the user and timely transfers the selected program information to the action script execution engine 101. By the effect of the timer 112, an agent is displayed on a display screen "n" minutes before the beginning the program to inform the user that a recommended TV program will start n-minutes later. For example, let assume that the user often viewed soccer game broadcasts on the TV set. In this case, the agent interface device stores a user keyword "soccer game broadcast" in the user preference database DB, refers to a TV program guide obtained by the EPG acquiring means 106 to find therein a soccer game to be broadcast and obtain information including date, start time and channel of the broadcast. As soon as it reached "n" minutes before the beginning of the broadcast on the date, the agent interface device displays on the TV display an agent to inform the user that the broadcast of a soccer game will start soon. The time to provide information can be preset on the timer 112. Now let assume the time is set to 5 minutes. In this instance, the agent appears on the TV screen 5 minutes before the beginning of the broadcast and, for example, speaks to the user "your favorite soccer game will be soon on air. Do you want to see it?" and at the same time presents the same text in a window on the TV screen. When the user vocally answered "YES" (as shown in FIG. 4) or inputted a response "Yes" by using the keyboard 21 or mouse (pointing device) 22, the television application program is activated and indicates the channel 2 on the TV screen as shown in FIG. 5.

Figure 6:
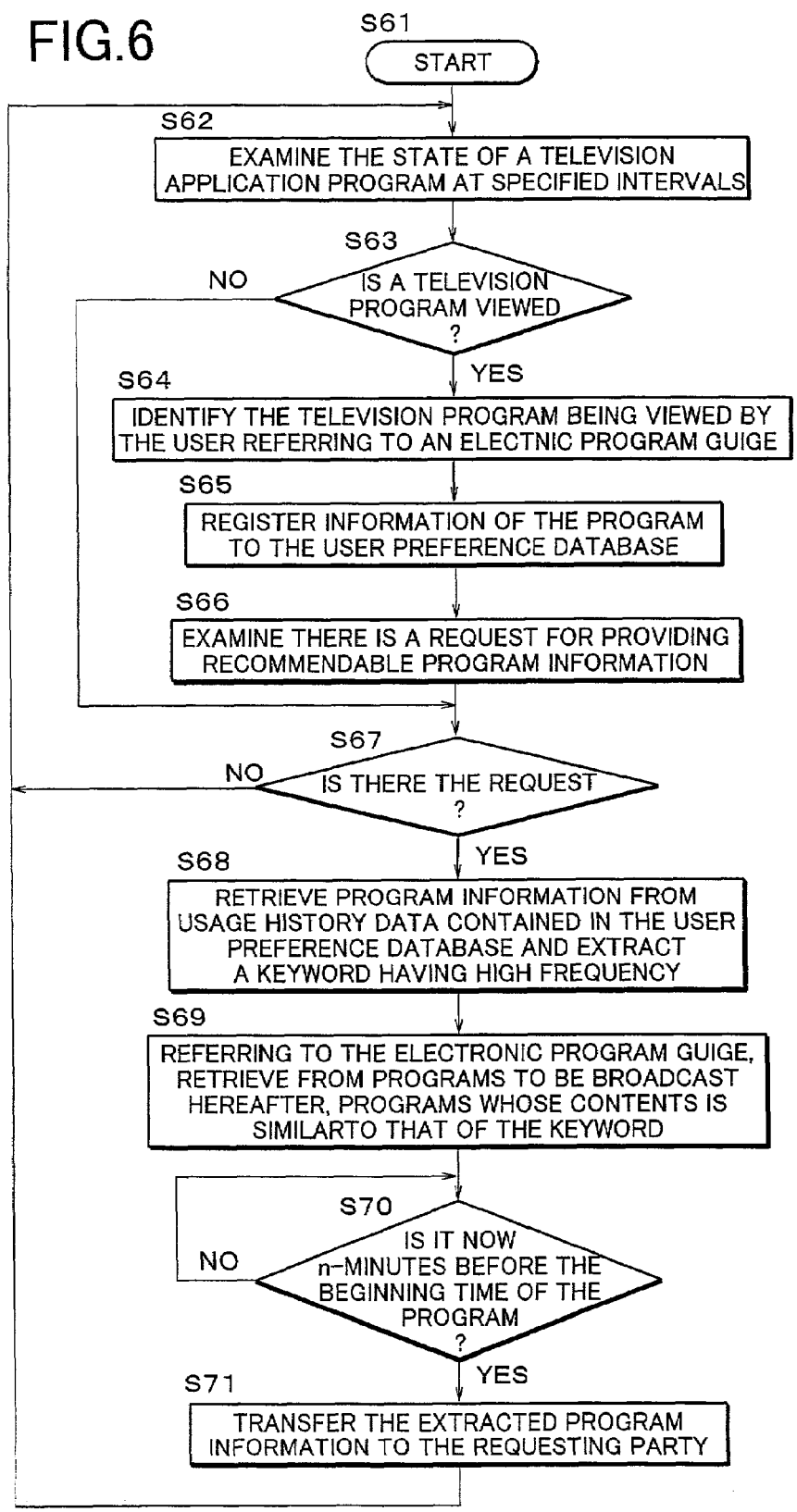
FIG. 6 is a flowchart depicting the operation of an agent interface device according to an embodiment of the present invention.

FIG. 6 is a flowchart depicting the operation of the information providing engine 107 of the agent interface device. When the application program started (Step S61), the information providing engine 107 examines the state of the television application program at specified intervals (Step S62) and, if no TV program is displayed on the TV set (Step S63), proceeds to Step S66. If the TV program is viewed in Step S63, the information providing engine 107 identifies the program that the user now enjoys, referring to an EPG (Electronic Program Guide) (Step S64) and, then, stores the TV program data into the user preference database DB108 (Step S65). The EPG is obtained by the EPG information acquisition means 106. In practice, the EPG information is available from the Internet or data broadcasting by any of usual methods not defined herein. In Step S66, the information providing engine 107 examines whether there is a request to present recommendable programs. If no request is given (Step S67), the engine 107 returns to Step S62. If any request was given (Step S67), the engine DB108 refers to the usage history contained in the user preference database DB108 to extract a keyword common to the programs that the user preferred specially (Step S68). In this case, the engine 107 may use the retrieval engine 102 if necessary. In Step S69, the engine 107 refers to the EPG of TV program to be broadcast and searches therein a program having the common keyword previously extracted from the database DB108 or a similarly meaning keyword. In this case, the engine 107 may uses the retrieval engine 102 if necessary. In Step S70, the engine 107 extracts the date and the start time of the program from the retrieved program information and examines by using the timer 112 whether it is now n-minutes before the beginning of the program. If it is not n-minutes before the start time, the engine 107 returns to Step S70. If it is n-minutes before the start time, the engine 107 transfer the extracted program information to the action script execution engine 101 that is a origin of requesting for the information. The time-to-present may be optionally set by the user. The engine 107 returns to Step S62. The action script to be executed in this instance describes to present an agent who has a suitable conversation with the user in regard to the selected TV program.

The above operation procedure causes the agent to appear on a TV screen "n" minutes before the start time of the program and have a conversation with the user in regard to the recommended TV program.

[Third Embodiment]

In this embodiment, the genre-based recommendation is used instead of the program-based recommendation described for the second embodiment. The term "genre" means a category of TV programs according to their contents described in program information acquired by the EPG acquiring means 106. Genres (categories) of TV programs are, for example, TV drama, movie, sports, entertainment, hobbies/Living News, music, variety shows, social news and reports, education and animation/puppet shows, etc. The genres will not be further defined herein.

The operation procedure similar to that of the second embodiment is executed to select genre-based recommendable programs, display an agent on a screen n-minutes before the start time of each of the genre-based recommended programs and make conversation with the user in respect to the recommended genre-based program.

[Fourth Embodiment]

Figure 7:
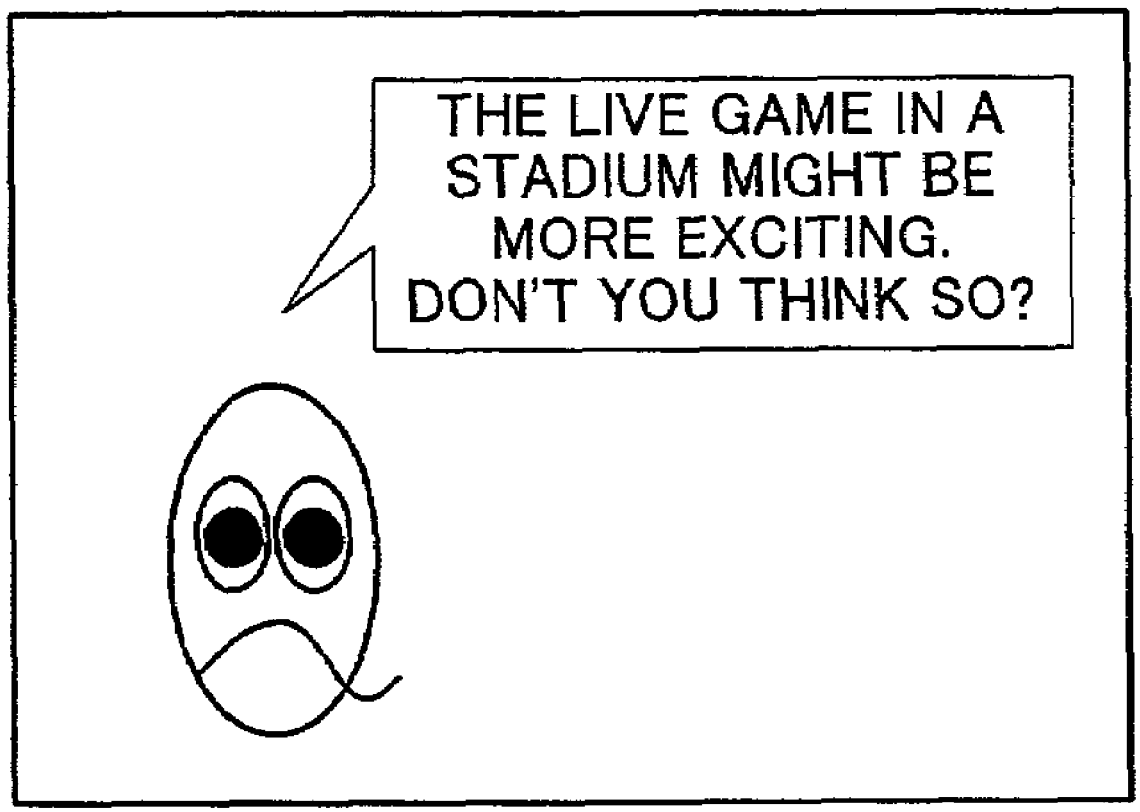
FIG. 7 is an exemplary display image of an agent of an agent interface device according to an embodiment of the present invention.

FIG. 7 shows the second example of a screen image of an agent, according to the fourth embodiment of the present invention. The agent interface device of this embodiment refers to a TV program guide acquired by the EPG information acquisition means 106 and obtains therefrom information on a TV program that the user is now enjoying. When the user ended the television application program, the agent interface device transfers information to the action script execution engine 101 and causes the same engine to present on a TV screen an agent who may have a conversation with the user in respect to the TV program that the user viewed just before ending the Television application program. For example, let assume the user watched a soccer game broadcast and just finished the television application program. In this case, the agent immediately appears on the TV screen and speaks "The live game in a stadium might be more exciting, don't you think so?" with the same text indicated in a window.

Figure 8:
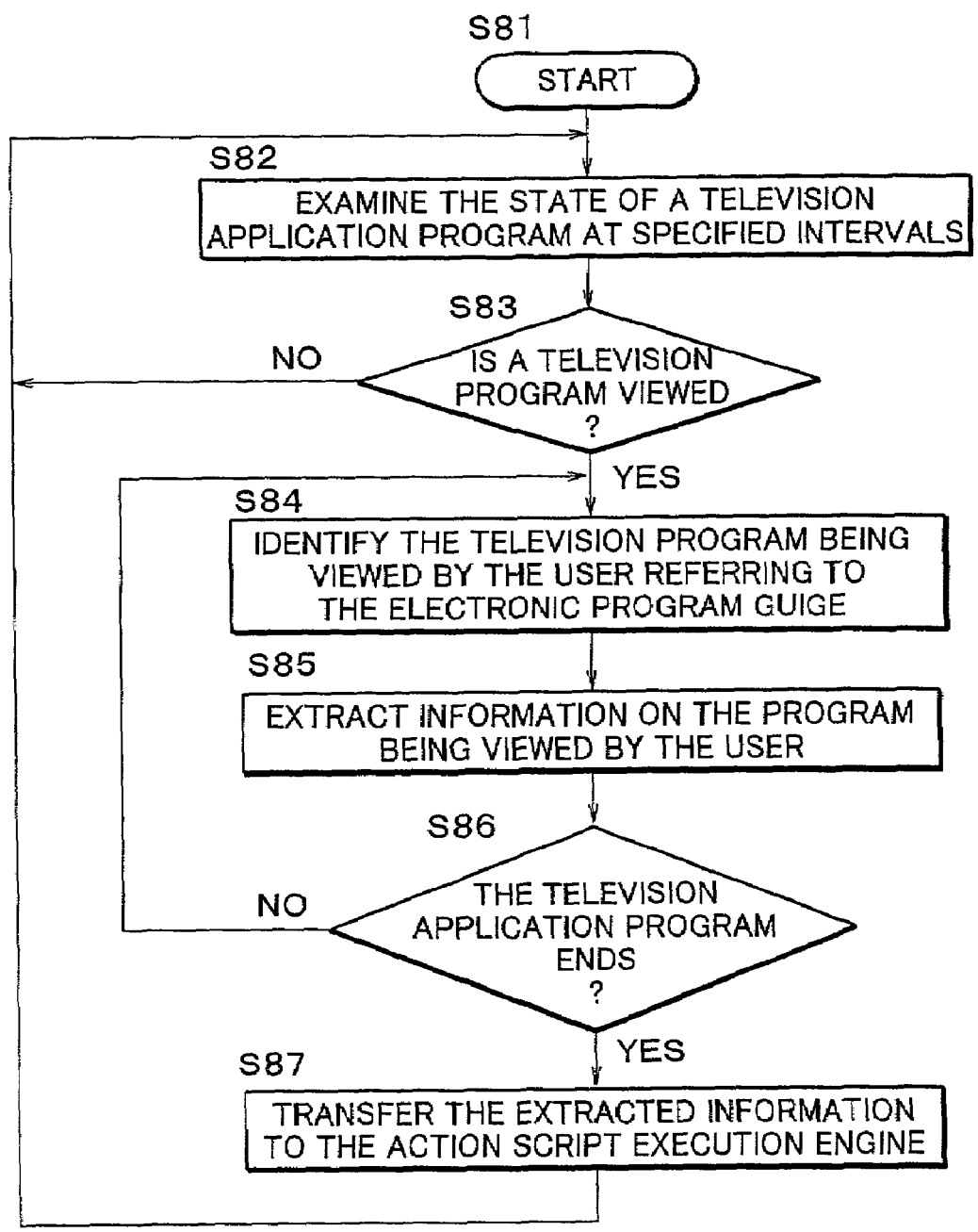
FIG. 8 is a flowchart depicting the operation of an agent interface device according to an embodiment of the present invention.

FIG. 8 is a flowchart depicting the operation of the information providing engine 107 of the agent interface device. When the program started (Step S81), the information providing engine 107 examines the state of the television application program at specified intervals. (Step S82) and returns to Step S82 if no TV program is displayed on the TV set (Step S83). If the TV program is viewed in Step S83, the engine 107 refers to an EPG and identifies the program that the user now enjoys (Step S84). The engine 107 then extracts the TV program information from the EPG, which information in this instance may contain the program name and the genre name. In Step S86, the engine 107 examines whether the television application program ended, and, if not, returns to Step S84. If the program ended (Step S86), the engine 107 transfers the extracted action script (TV program information) to the action script execution engine 101 (Step S87) and then returns to Step S82. The action script describes that an agent is presented to make conversation with the user in respect to the program information.

The above operation of the embodiment can realize such a particular effect that, as soon as the TV program ended, the agent appears on the TV screen to have a conversation with the user in respect to the just ended program.

[Fifth Embodiment]

Figure 9:
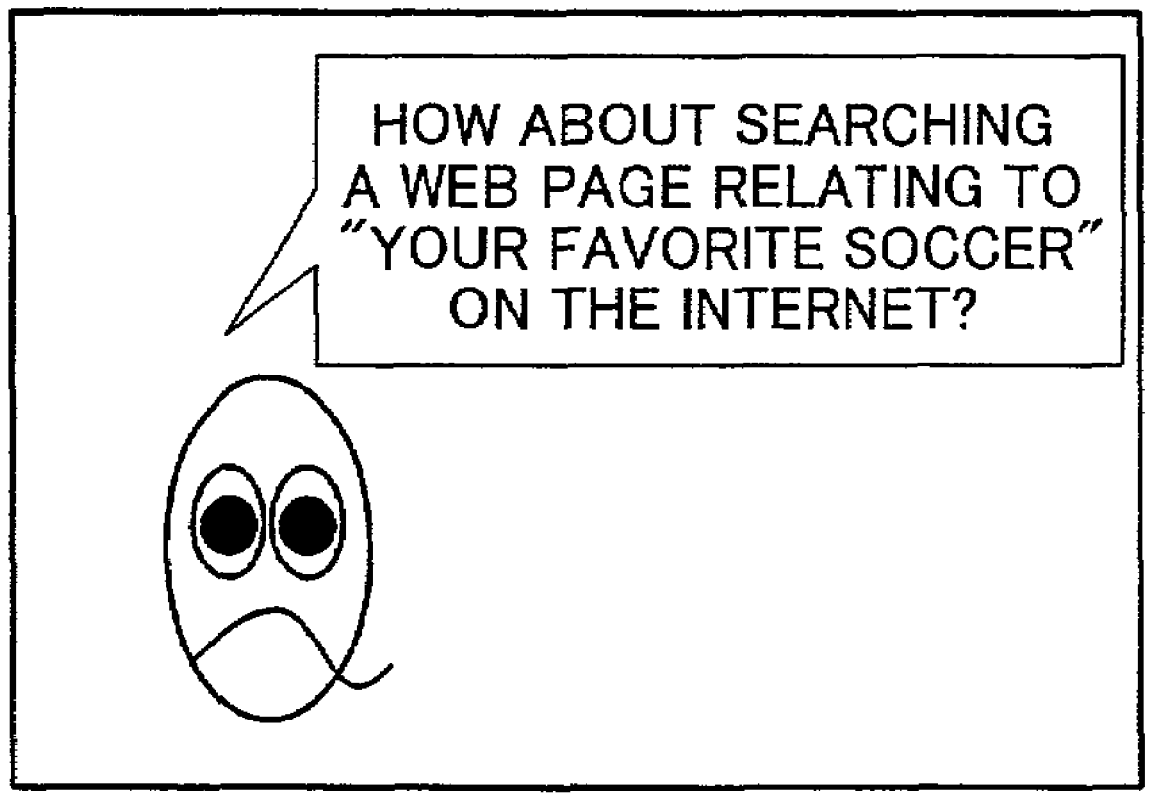
FIG. 9 is an exemplary display image of an agent of an agent interface device according to an embodiment of the present invention.
Figure 10:
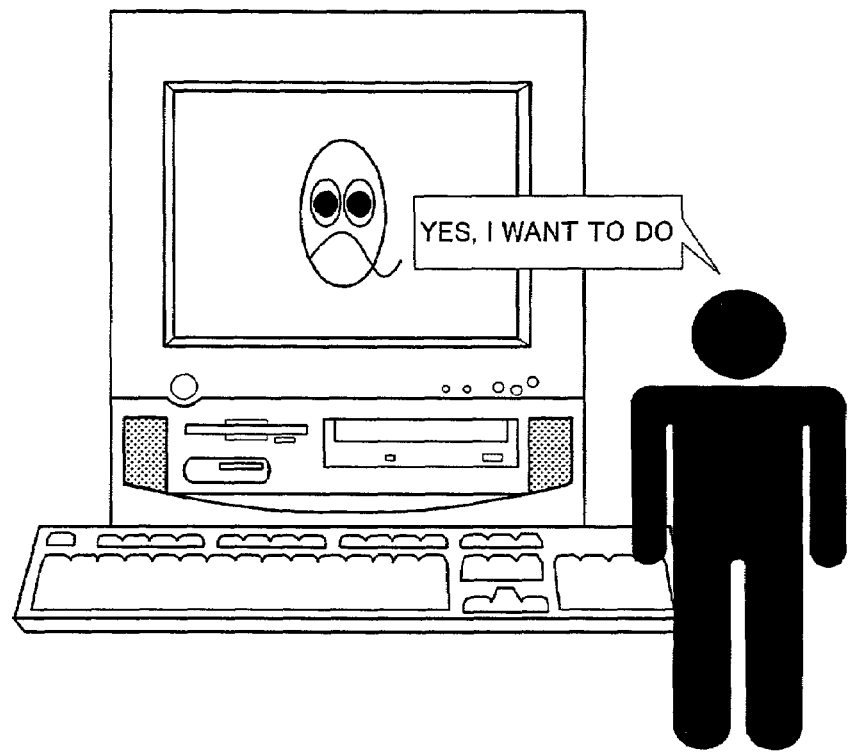
FIG. 10 illustrates an exemplary scene of usage of an agent interface device according to an embodiment of the present invention.
Figure 11:
FIG. 11 illustrates an exemplary scene of usage of an agent interface device according to an embodiment of the present invention.

FIG. 9 shows the third example of a screen image of an agent, according to the fifth embodiment of the present invention. This embodiment refers to a TV program guide acquired by the EPG information acquisition means 106 and obtains therefrom information on a TV program that the user is now viewing. When the user ended the television application program, the agent interface device transfers information to the action script execution engine 101 to present an agent on a TV screen, then connects to the Internet 23 through the communication portion 14 and searches an information site relating to the program just viewed by the user. For example, it is assumed the user watched a soccer game broadcast and just ended the Television application program. In this instance, the agent immediately appears on the TV screen and speaks "How about searching an Internet web page relating to <your favorite soccer>?" with the same text indicated in a window. When the user vocally answered "Yes" or inputted the same response by using the keyboard 21 or the mouse (pointing device) 22, the agent interface device drives an application program to carry out browsing a "soccer" web site on the Internet.

Figure 12:
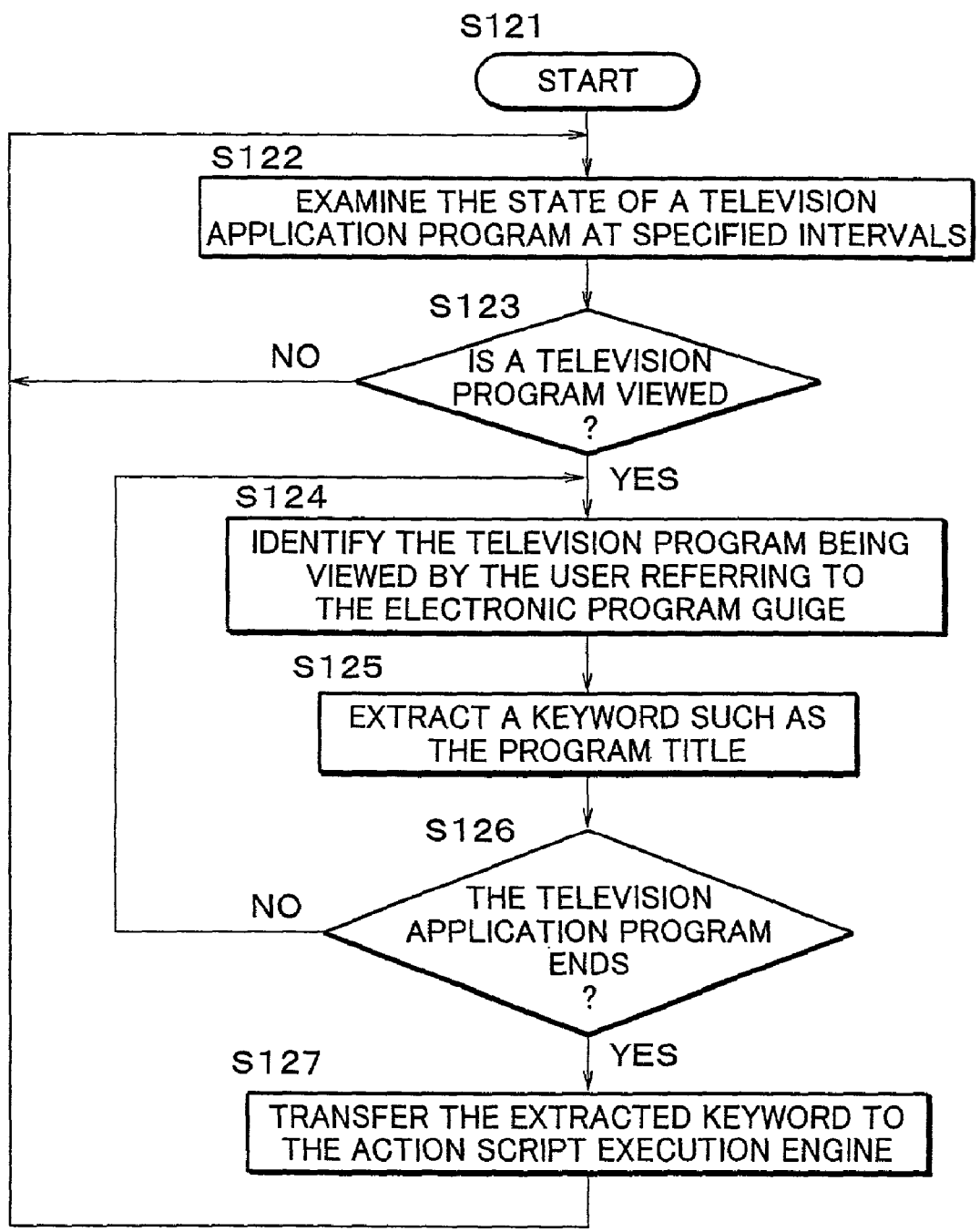
FIG. 12 is a flowchart depicting the operation of an agent interface device according to an embodiment of the present invention.

FIG. 12 is a flowchart depicting the operation of the information providing engine 107 of the agent interface device. When the program started (Step S121), the information providing engine 107 examines the current state of the television application program at specified intervals (Step S122) and returns to Step S122 if it judged no TV program being viewed on the TV set (Step S123). Having judged a TV program being viewed (Step S123), the engine 107 refers to an EPG and identifies the program that the user now enjoys (Step S124). The engine 107 then extracts a keyword, e.g., the TV program title (Step S125). In Step S126, the engine 107 examines whether the user ended the television application program. If the television application program is not ended, the engine 107 returns to Step S124. When the television application program ended (at Step S126), the engine 107 transfers an action script to the extracted keyword to the action script execution engine 101 (Step S127) and then returns to Step S122. The action script describes that an Internet browser application program shall be driven to search for the keyword and browse relevant web sites.

The above operation of this embodiment realizes such a particular effect that web site pages relating to the TV program just watched by the user is explored and browsed as soon as the TV program ended.

[Sixth Embodiment]

This embodiment is analogous to the fourth embodiment but deals with video programs recorded on the recording devices (media) such as a video recording tape, CD-RW, DVD-RW, MO and hard disk, while the latter deals with TV programs viewable by the television application. Therefore, the agent interface device in this embodiment recognizes the end of a video program (i.e., a recording device) and transfers information on the video program to the action script execution engine 101.

Based on the video program information, this embodiment conducts the same procedure as that of the fourth embodiment to display an agent immediately after the end of the video program and have a conversation with the user in regard to the just watched program.

[Seventh Embodiment]

This embodiment is analogous to the fifth embodiment but deals with video programs recorded on the recording devices (media) such as a video recording tape, CD-RW, DVD-RW, MO and hard disk, while the latter deals with TV programs viewable by the television application. Therefore, the agent interface device in this embodiment recognizes the end of a video program (i.e., a recording device) and transfers information on the video program to the action script execution engine 101.

Based on this information, this embodiment displays an agent immediately after the end of the video program and starts searching a web site relating to the just watched program.

[Eighth Embodiment]

In this embodiment, the television application described in the fourth embodiment is replaced by an Internet browser application program and information of an browsed web site is transferred to the script execution engine 101 after recognition of finishing the Internet browser application program.

The operation of the embodiment realizes such a particular effect that an agent appears on a display screen immediately after the end of the Internet browser application program to have a conversation with the user in regard to the just viewed web site.

[Ninth Embodiment]

In this embodiment, the television application described in the fifth embodiment is replaced by an Internet browser application program and information of an browsed web site is transferred to the script execution engine 101 after recognition of finishing the Internet browser application program.

The operation of the embodiment realizes that an agent appears on a display screen immediately after the end of the Internet browser application program and starts browsing another web site relating the just viewed web site in the Internet.

[Tenth Embodiment]

In this embodiment, an agent can change the theme of a conversation with the user depending on a keyword of a TV program being viewed by the user. For example, when the user did an incorrect operation with watching no TV program, an agent appears on a display screen and outputs a message "I cannot accept your operation" in both in the speech mode and the text mode. For example, if a keyword "soccer" is extracted while watching the soccer game broadcast, the agent appears and outputs a spoken message and a same text message regarding the extracted keyword, e.g., "I cannot accept your request. You may receive a Red card if you should repeat the incorrect operation so may times".

Figure 13:
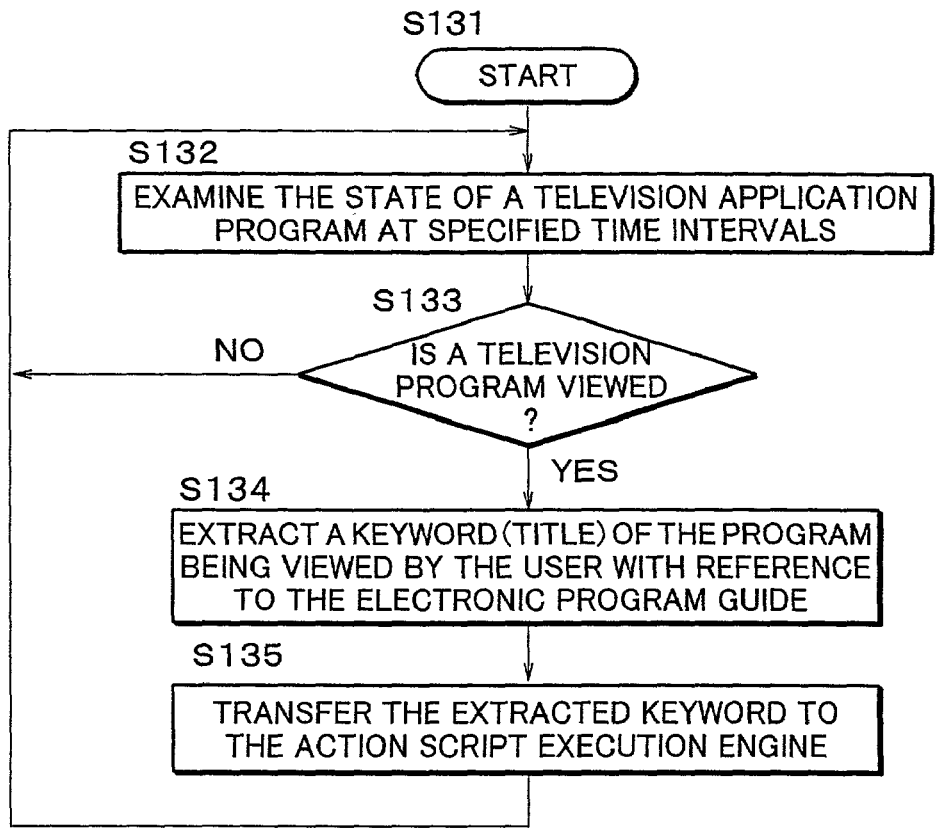
FIG. 13 is a flowchart depicting the operation of an agent interface device according to an embodiment of the present invention.

FIG. 13 is a flowchart depicting the operation of the information providing engine 107 of the tenth embodiment. Once the program started in Step S131, the information providing engine 107 examines a current state of the television application program at specified time intervals (Step S132). If no TV program is viewed (Step S133), the engine 107 returns to Step S132. When a TV program is watched (Step S133), the engine 107 refers to the EPG and extracts therefrom a keyword (e.g., title) of the program being viewed by the user (Step S134). The engine 107 transfers the obtained keyword to the action script execution engine 101 and then returns to Step S132. The action script may be selected depending on the keyword and the conversation script may be decided depending on the keyword.

The above operation of the embodiment provides such a particular effect that a conversation theme can be changed depending on a detected keyword.

[Eleventh Embodiment]

Figure 14:
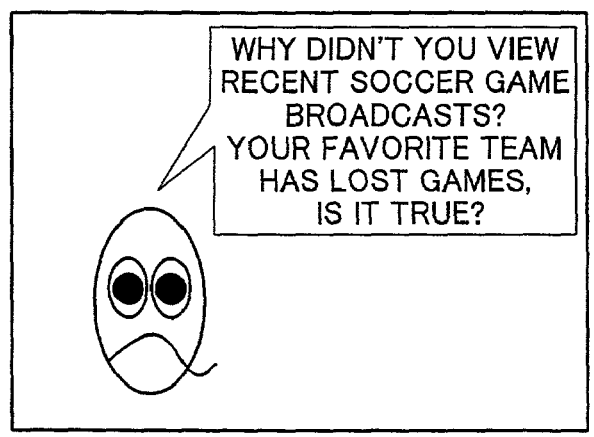
FIG. 14 is an exemplary display image of an agent of an agent interface device according to an embodiment of the present invention.

FIG. 14 shows the fourth example of a display image of an agent, according to the eleventh embodiment of the present invention. When one of programs frequently viewed by the user and registered in the user preference database DB108 has not been watched by the user within the time interval of n days after the last watching date, the embodiment transfers the information to the action script execution engine 101 that in turn displays the agent on a display screen to execute the conversation script regarding the fact that the user has not watched the favorite program. For example, when the time interval from the last watching a soccer game broadcast exceeds 30 days, the agent is displayed to output a message "Why didn't you watch recent soccer game broadcasts? Your favorite team has lost games?". This message can be outputted in the speech mode and the text mode at a time.

Figure 15:
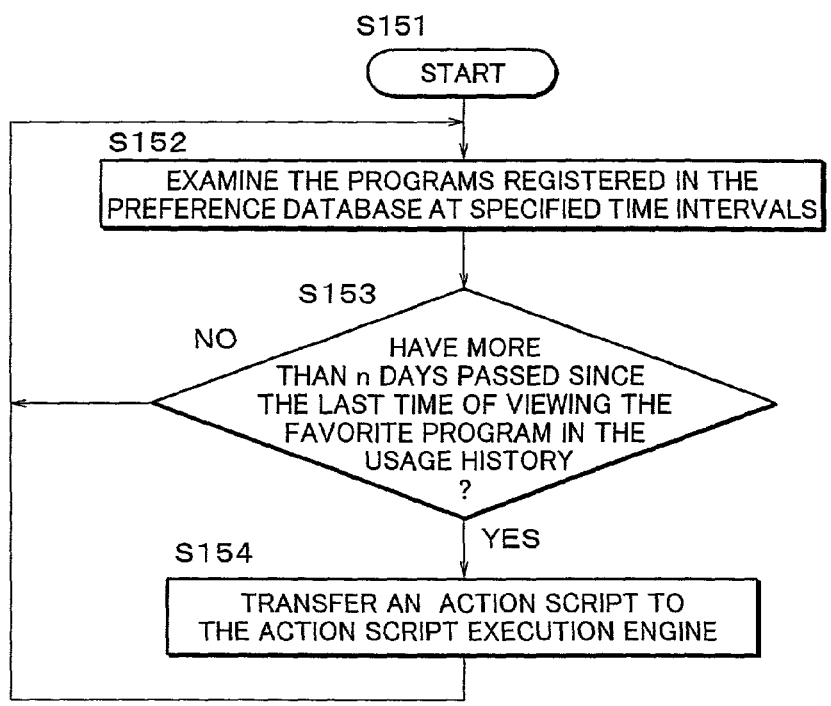
FIG. 15 is a flowchart depicting the operation of an agent interface device according to an embodiment of the present invention.

FIG. 15 is a flowchart depicting the operation of the information providing engine 107 in the eleventh embodiment. Once the program started in Step S151, the information providing engine 107 examines program information registered in the preference database DB108 at specified time intervals (Step S152). In Step S153, the engine 107 examines whether any one of the programs registered in the user preference database DB108 has an interval of more than n days from the last watching date. If not, the engine 107 returns to Step S152. When there is found a program having the non-watched period exceeding n days, the engine 107 transfers the detected program information to the action script execution engine 101 and then returns to Step S152. The action script to be executed is decided in accord with the non-watched period. The conversation content may be changed depending on the non-watched period (time interval).

As the result of the above operation of the embodiment, a theme of the conversation can be selected in accord with the non-watched period.

[Twelfth Embodiment]

Figure 16:
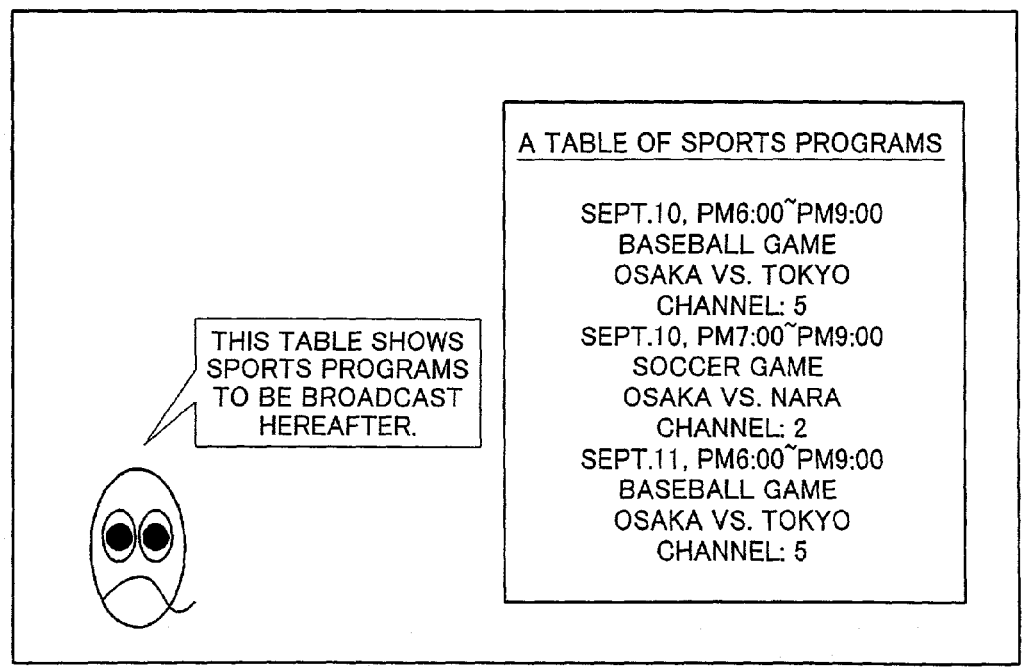
FIG. 16 is an exemplary display image of an agent of an agent interface device according to an embodiment of the present invention.

FIG. 16 shows the fifth example of a display image of an agent, according to the twelfth embodiment of the present invention. The agent interface device identifies a user preferred program genre by calculating a sum of viewing frequencies for each genre from usage history information stored in the preference database DB108, recognizes the time of starting the television application program by the timer 23, selects the preferred genre programs being currently broadcast or to be broadcast after now from a TV program guide obtained by the EPG acquisition means 106 and displays a table of genre-based preferred programs on the display screen. For example, if the user has frequently viewed broadcasts of soccer games, sports is identified as the preferred genre and a table of programs of the sport genre is displayed.

Figure 17:
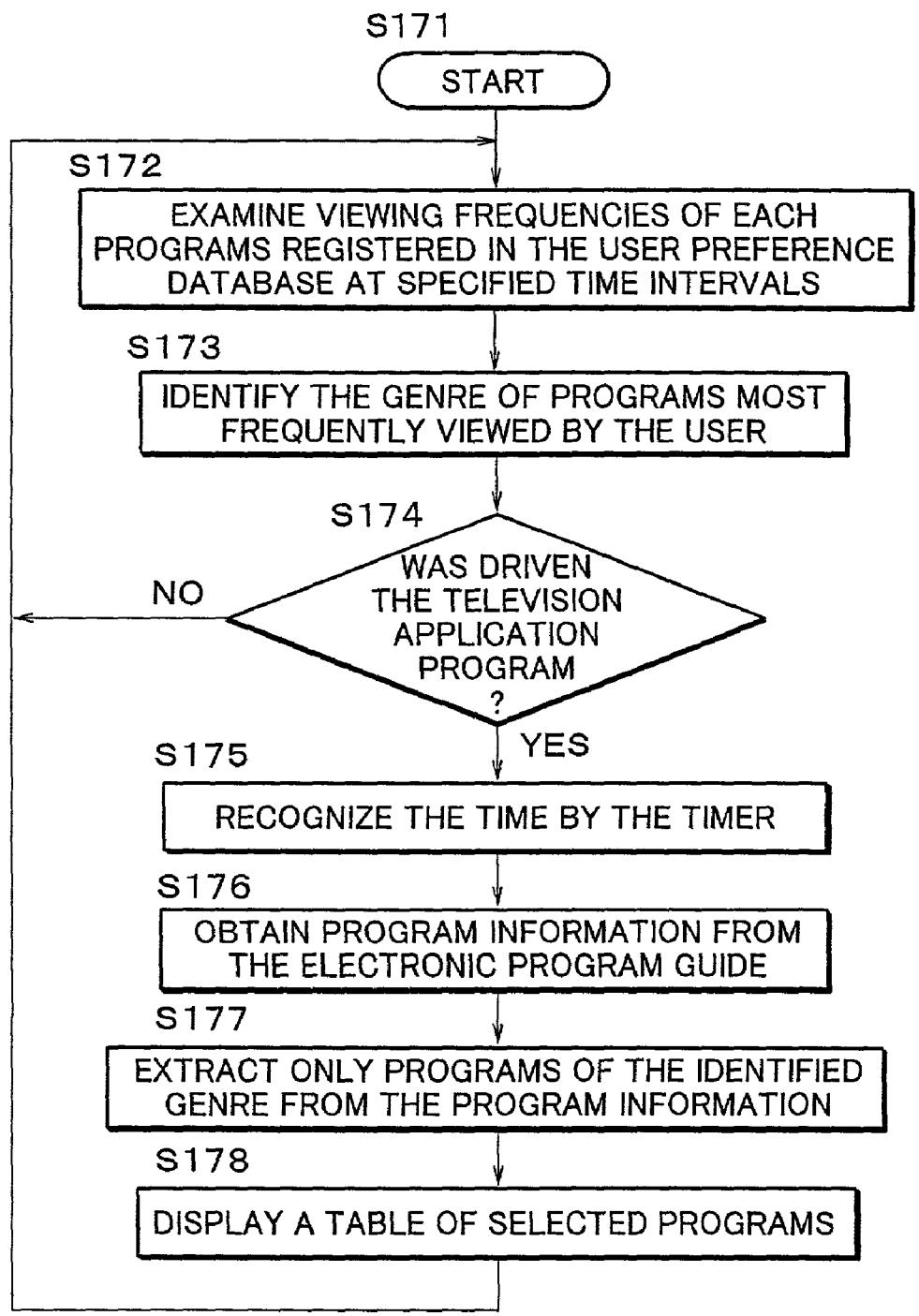
FIG. 17 is a flowchart depicting the operation of an agent interface device according to an embodiment of the present invention.

FIG. 17 is a flowchart depicting the operation of the information providing engine 107 of the twelfth embodiment. Once the program started in Step S171, the information providing engine 107 extracts the viewing frequency data for each genre from the usage history information stored in the user preference database DB108 at specified time intervals (Step S172). Namely, the engine S107 identifies the genre of programs having the highest viewing frequency (Step S173). The engine 107 examines whether the television application program is driven or not (Step S174). If not, the engine 107 returns to Step S172. If the television application program was driven, the engine 107 recognizes, from the timer 112, the time of starting the television application program. The engine 107 obtains a table of programs being currently broadcast or to be broadcast from TV program guides acquired by the EPG acquisition means 106 (Step S176) and extracts from the above table only programs of the genre decided in Step S173. Finally, the engine 107 displays a table of selected programs on the display screen (Step S178) and then returns to Step S172.

As the result of the above operation of the embodiment, a table of preferred genre programs can be prepared based on the usage history and displayed on the display screen immediately after starting the television application program.

[Thirteenth Embodiment]

Figure 18:
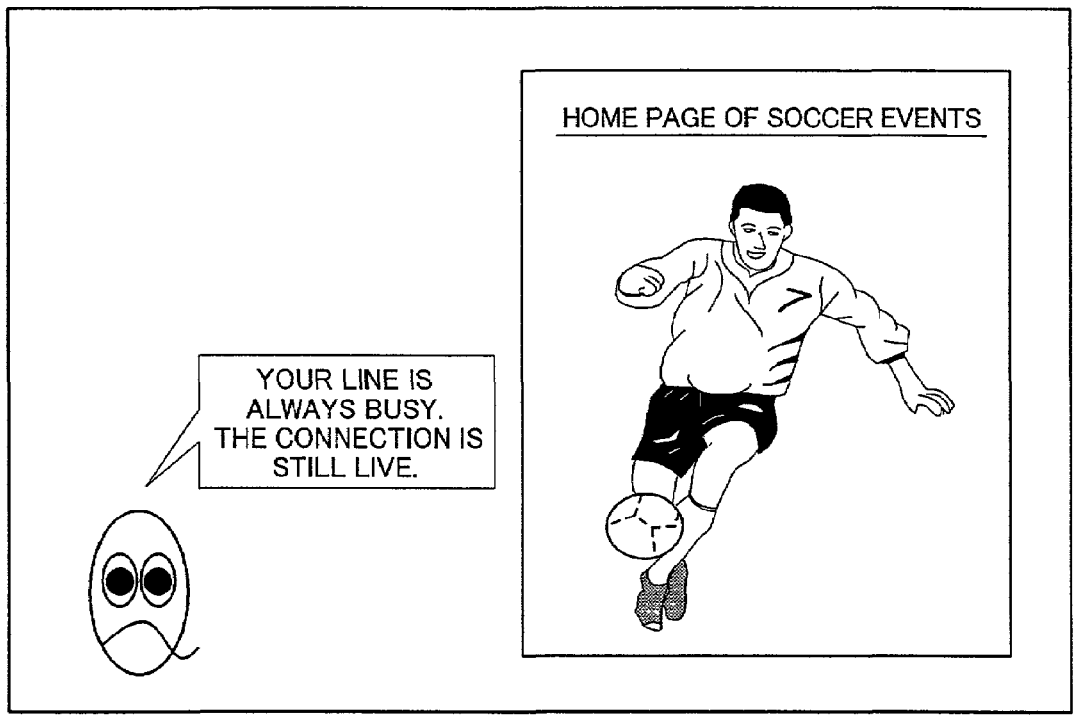
FIG. 18 is an exemplary display image of an agent of an agent interface device according to an embodiment of the present invention.

FIG. 18 shows the sixth example of a display image of an agent, according to of the thirteenth embodiment of the present invention. Once the user activated an Internet browser application program to browse web sites, this embodiment monitors the duration of connection of the user's communication line to the Internet by the timer 112 and, when n minutes elapsed, displays the agent on the display screen to inform the user that the communication line is still connected to the Internet. For example, when 120 minutes elapsed after starting the Internet browsing application and connecting the communication line to the Internet, the agent is displayed on the display screen to output a warning message "Your line is always busy. The connection is still live". This message may be outputted vocally and visually at a time.

Figure 19:
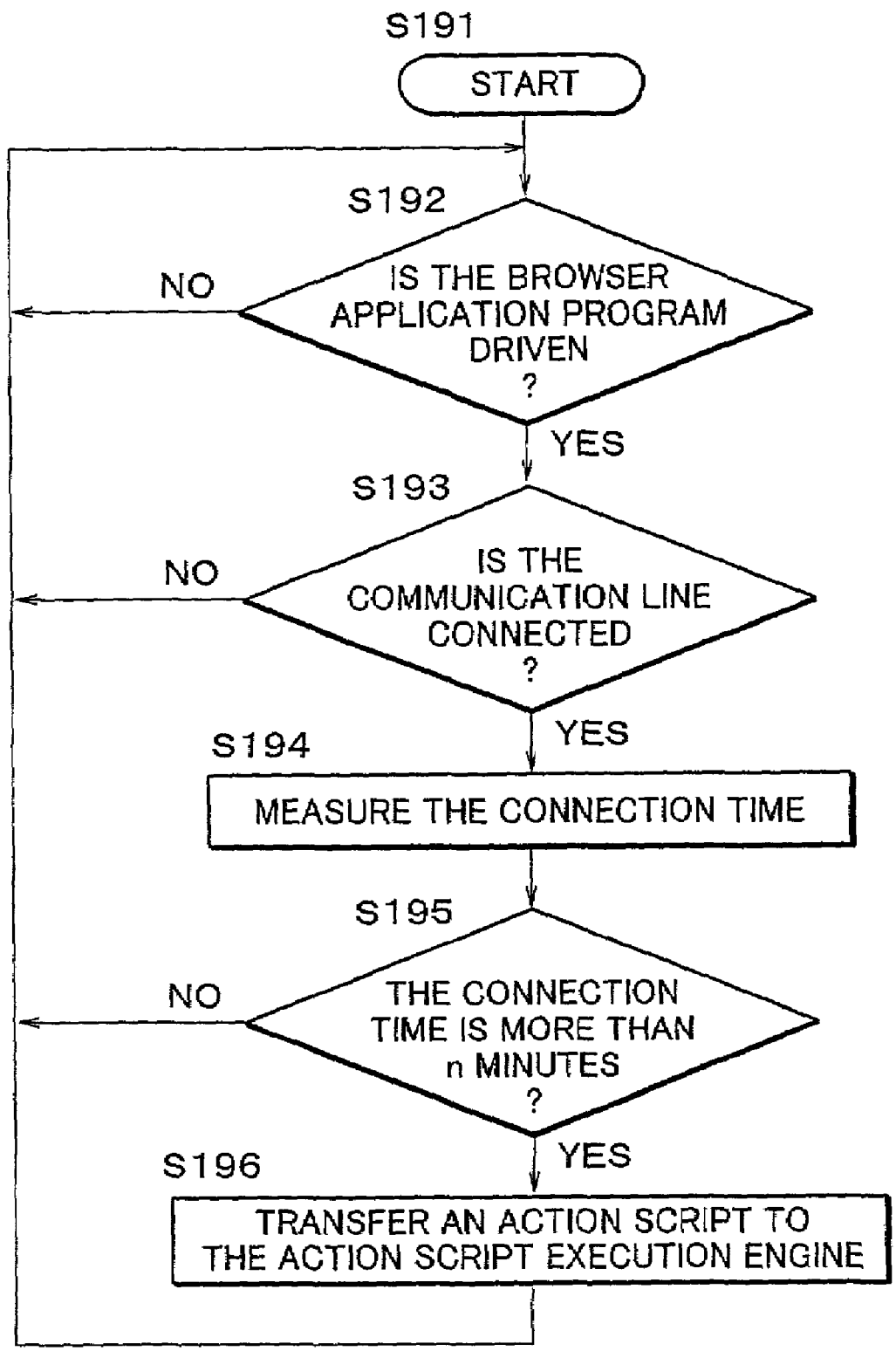
FIG. 19 is a flowchart depicting the operation of an agent interface device according to an embodiment of the present invention.

FIG. 19 is a flowchart depicting the operation of an agent interface device according to the thirteenth embodiment of the present invention. Once the program started in Step S191, the agent interface device examines whether the Internet browser application program is driven (Step S192). If not, the device returns to Step S192. If the program was driven, the device examines whether the communication line is connected to the Internet (Step S193). If not, the device returns to Step S192. When the communication line is connected to the Internet, the device counts the connection period by the timer 112. The device examines whether the connection period reaches n minutes (Step S195). If not, the device returns to Step S192. If n minutes elapsed, the device transfers an action script descriptive of "the communication line being left as connected to the Internet" to the action script execution engine 101. The time setting can be freely changed by the user. The device then returns to Step S192.

As the result of the above operation of the embodiment, the agent can inform the user of the communication line being left as connected to the internet when n minutes elapsed after driving the internet browser application program.

[Fourteenth Embodiment]

Figure 20:
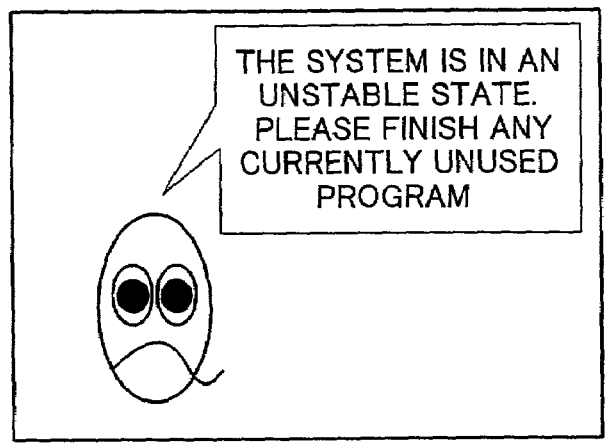
FIG. 20 is an exemplary display image of an agent of an agent interface device according to an embodiment of the present invention.

FIG. 20 shows the seventh example of a display image of an agent, according to the fourteenth embodiment of the present invention. When the user activated a plurality of application programs and the remaining capacity of the system resource was reduced to n %, this embodiment displays the agent on the display screen to inform the user that the operation will be unstable due to shortage of the system resource. For example, when the remaining capacity of the system resource was reduced to 20%, the agent appears on the display screen and outputs a warning message "The system is in an unstable state. Please finish any currently unused program". This message can be outputted in both the speech mode and the text mode at a time.

Figure 21:
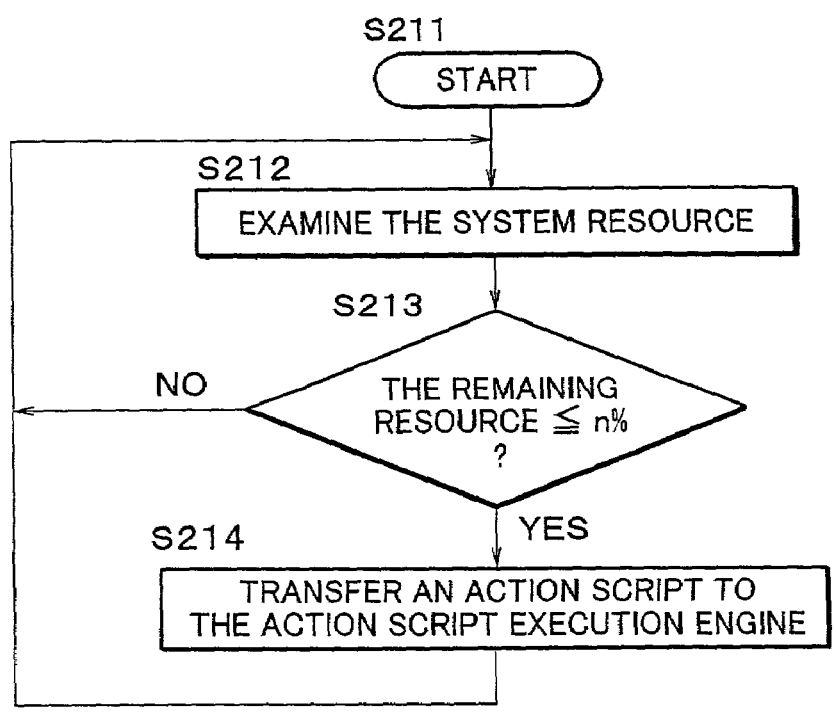
FIG. 21 is a flowchart depicting the operation of an agent interface device according to an embodiment of the present invention.

FIG. 21 is a flowchart depicting the operation of an agent interface device according to the fourteenth embodiment of the present invention. When the program started in Step S211, the agent interface device examines the remaining capacity of the system resource (Step S212) and decides whether the remaining resource capacity is no more than n %. In Step S213, if it is more than n %, the device returns to Step S212. If it is no more than n %, the device transfers action script describing "shortage of the system resource" to the action script execution engine 101 (Step S214).

As the result of the above operation of the embodiment, the agent can inform the user of the shortage of the system resource when the remaining resource capacity is reduced to n %.

It should be understood that the foregoing relates to only preferred embodiments of the invention, and that the invention is not limited to the specific embodiments thereof except as defined in the appended claims.

The agent interface device according to the present invention can offer the following advantages:

The user can operate a variety of applications through interactions with the personified agent interface. Namely, the agent interface device may serves as a unified interface for a variety of applications.

The user may not loss a chance of viewing a favorite television program because the agent previously informs him/her that the program will be broadcasted.

The user can enjoy a conversation with the agent who can speak about the television program the user has just viewed.

Detailed data related to the television program that the user just has viewed can be obtained from web sites by browsing, which is realized through the interaction with the agent interface.

The agent interface can prepares a table of preferred genre programs based on the usage history data stored in the user preference database and presented it on the display screen, wherefrom the user can know new interesting programs that he/she has not viewed.

When the communication line was left as connected to the Internet for a specified time, the agent interface informs the user of the connected state of the communication line. The user can cut off the communication line in due time.

The agent interface informs the user that the remaining capacity of the system resource may be short for the current applications. This enables the user to take suitable measures to avoid the unstable operation of the system.

The invention claimed is:

1. An agent interface device for displaying an artificial agent for providing information by the agent's action and speech, comprising:

an agent interface including an agent display control means for controlling the display and action of the agent, a voice output means for generating a speech of the agent, and an input means for input by a user, an action script execution engine for driving the agent interface into actual action according to an action script describing means to control the agent interface, a retrieval engine for retrieving an adapted action script from an action script database and transferring the action script to the action script execution engine, an application program interface for controlling an application program, an electronic program guide information acquiring means for acquiring an electronic broadcast program guide, a preference database for analyzing user preferences from information provided by the electronic program guide information acquiring means and the application program interface and storing analysis results therein, an information providing engine for providing information to a user according to information stored in the preference database, and a timer for setting a time for providing information to the user by the information providing engine, wherein the agent interface displays the agent immediately after the end of a television program and controls the agent to have a conversation with the user about the just viewed program.

2. An agent interface device as defined in claim 1, wherein the information providing engine decides a user preferred television program from a user usage history of a television application controllable by the application program interface according to information from the electronic program guide information acquiring means and information from the preference database, and the agent interface displays the agent at a specified time before a start time of the user preferred TV program and causes the agent to have a conversation with the user about the user preferred TV program by a speech output through the voice output means.

3. An agent interface device as defined in claim 1, wherein the information providing engine decides a user preferred genre from a user usage history of a television application controllable by the application program interface according to information from the electronic program guide information acquiring means and information from the preference database, and the agent interface displays the agent at a specified time before a start time of the user preferred genre TV program causes the agent to have a conversation with the user about the user preferred genre by a speech output through the voice output means.

4. An agent interface device as defined in claim 1, further comprising an internet retrieval means for retrieving information on the Internet from a web site relevant to the just viewed program.

5. An agent interface device as defined in claim 1, wherein the agent interface displays the agent immediately after ending a video recording device controllable by the application program interface and makes conversation with the user about a just viewed program from the video recording device.

6. An agent interface device as defined in claim 5, further comprising an internet retrieval means for retrieving information on the Internet from a web site relevant to the just viewed program from the video recording device.

7. An agent interface device as a defined in claim 1, wherein the agent interface displays the agent immediately after ending an internet browser application program controllable by the application program interface and causes the agent to make conversation with the user about a just browsed web site.

8. An agent interface device as defined in claim 7, further comprising an internet retrieval means for retrieving information from a web site on the Internet relevant to the just browsed site.

9. An agent interface device as defined in claim 1, wherein the agent interface changes a theme of a conversation in accordance with a keyword of a currently viewed program displayed by a television application controllable by the application program interface.

10. An agent interface device as defined in claim 1, wherein the agent interface changes a theme of a conversation according to time interval information obtainable from a usage history of a television application controllable by the application program interface.

11. An agent interface device as defined in claim 1, wherein the information providing engine prepares and displays a table of frequently watched genre programs on the basis of a usage history of a television application controllable by the application program interface.

12. An agent interface device as defined in claim 1, wherein the agent interface informs the user of a communication line still connected to the Internet after a specified period of time has elapsed after driving an internet browser application program controllable by the application program interface.

13. An agent interface device as defined in claim 1, wherein the agent interface informs the user of a shortage of system resources when a resource of the system runs low.

14. An interface for a television comprising:

an animated agent that provides an interface between one or more control applications of the television and a user;

an engine that controls the animated agent; and an electronic program guide database accessible to the engine and storing information relating to television programs, wherein the engine controls the animated agent to initiate a conversation with a user regarding a television program viewed by the user when viewing of the television program ends.

15. An interface as defined in claim 14, wherein the conversation includes a request for user interest in retrieving information from the internet relating to the viewed television program and one of the control applications is responsive to the user interest for retrieving the information based on one or more keywords associated with the viewed television program in the electronic program guide database.

16. An interface as defined in claim 14, wherein the viewed television program is supplied from a playback device.

* * * * *